Figure 1:
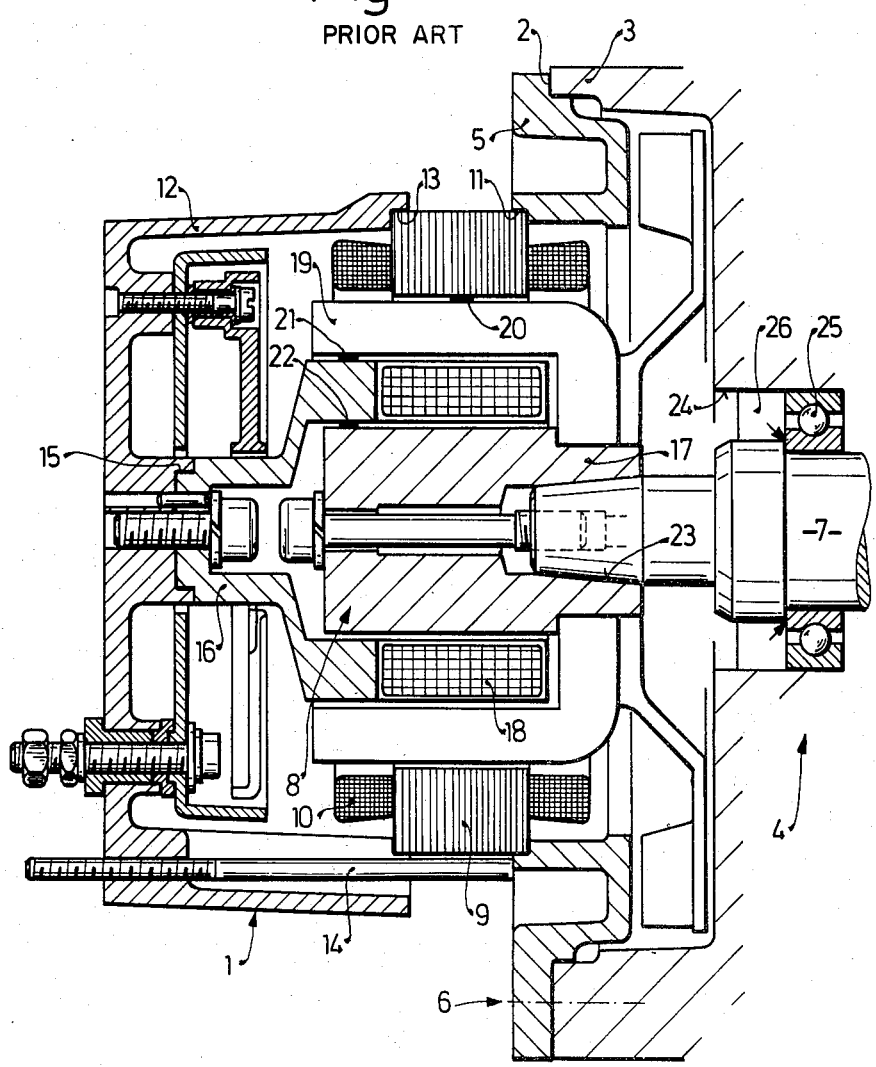

United States Patent [19]

Binder

[11] 4,286,187
[45] Aug. 25, 1981

[54] BEARINGLESS GENERATOR AND ROTARY MACHINE COMBINATION

[75] Inventor: Georg Binder, Bechhofen, Fed. Rep. of Germany

[73] Assignee: Robert Bosch GmbH, Stuttgart, Fed. Rep. of Germany

[21] Appl. No.: 22,283

[22] Filed: Mar. 20, 1979

[30] Foreign Application Priority Data

Apr. 14, 1978 [DE] Fed. Rep. of Germany ....... 2816180

[51] Int. Cl.$^3$ ............................................. H02K 5/00
[52] U.S. Cl. ....................................... 310/91; 310/89; 310/90; 310/112; 310/266
[58] Field of Search ....................... 310/91, 89, 90, 42, 310/263, 266, 112, 113, 68 D; 322/13

[56] References Cited

U.S. PATENT DOCUMENTS

| 2,928,963 | 3/1960 | Bertsche | 310/266 |
| 2,987,637 | 6/1961 | Bertsche | 310/266 |
| 3,150,278 | 9/1964 | Clark | 310/89 |
| 3,215,878 | 11/1965 | Woodward | 310/263 |

FOREIGN PATENT DOCUMENTS

| 1048439 | 12/1953 | France | 310/263 |
| 1545514 | 11/1968 | France | 310/266 |
| 460146 | 9/1968 | Switzerland | 310/263 |

Primary Examiner—R. Skudy
Attorney, Agent, or Firm—Frishauf, Holtz, Goodman & Woodward

[57] ABSTRACT

To simplify manufacture and improve concentricity of operation of the rotating parts of a claw pole generator with respect to the stationary parts thereof, in which the generator as such has no bearing elements and the rotating parts are supported solely from the shaft of the machine with which the generator is associated, the interfitting centering engagement of surfaces between the generator and the machine of the stationary part and also of the rotary part are all located at the side of the generator adjacent the machine, thereby avoiding accurate machining and positioning of generator elements with respect to other elements of the generator which, in turn, are located on the machine. In a preferred form, the field pole structure of the generator is fitted into the bore which receives the main bearing of the remote machine, thereby avoiding the necessity of forming another concentric positioning shoulder or the like on the machine end structure.

5 Claims, 2 Drawing Figures

BEARINGLESS GENERATOR AND ROTARY MACHINE COMBINATION

The present invention relates to a bearingless, remotely journalled generator construction which permits assembly to a machine having a drive shaft, in which the drive shaft itself provides the mechanical support for the shaft of the generator, and the generator is additionally secured to the housing of the machine, while permitting accurate centering of the generator to the housing of the machine with decreased and more accurately placed air gaps between the rotary and stationary portions of the generator.

BACKGROUND AND PRIOR ART

It is frequently necessary to attach a generator, typically a three-phase generator, to another machine; to decrease the axial length, and to utilize existing bearings, it has been proposed to form the shaft of the existing machine with a conical projection, for example in the form of a stub shaft, with which a shaft element of the generator can be engaged. This shaft element of the generator then carries the rotor structure thereof. The air gap between the rotor structure of the generator and the stator thereof is critical. This is particularly so if the generator is of the slip-ringless, interdigited or claw pole-type construction, in which a stationary field is used, the armature winding is likewise stationary, and the rotor is in form of magnetically conductive elements, with interruptions, which rotates in the space between the stator field and the stator armature, thus relating in two air gaps, that is, between the field and the rotor and between the rotor and the armature. Accurate positioning of the stationary and the rotary elements is therefore of prime importance so that the air gaps will be uniform. This requires extreme accuracy in manufacture both of the generator as well as of the matching machine components, and additionally extreme accuracy in assembly—frequently difficult to obtain, particularly under field assembly conditions. This type of generator is particularly suited as an exciter generator for use with prime movers, such as turbines, engines of various types, or transmission units, to provide additional electrical power by external association of the generator with a shaft of the prime mover, gear, or the like, which may be termed, collectively, "rotary machine," and providing the motive power for the generator.

THE INVENTION

It is an object to provide a generator structure in which the relative position of the rotor and stator components is determined not by the generator structure as such, but by an external, foreign, or remote rotary machine having an output shaft, and in which the positional relationships can easily be predetermined with a high degree of accuracy.

Briefly, the interfitting centering engagement surfaces between the generator and the machine of the stationary parts of the generator, that is, in a claw pole generator, the stator and the field structure, and the surfaces of the rotary parts of the generator and the machine, that is, the claw pole rotor thereof, are all located at the side of the generator adjacent the machine, so that alignment of the stationary parts with respect to the shaft of the machine is determined by the machine housing itself, or by the structural elements thereof surrounding the shaft, for example the bore through which the shaft passes and in which, for example, the machine bearing is seated. Thus, by associating the stationary parts of the generator—in their respective position—with respect to the center of the shaft of the machine, the air gaps which arise in the generator between the rotary and stationary portions thereof will likewise be accurately predetermined.

In accordance with a preferred embodiment, the field structure for a claw pole generator can be carried on a field carrier which has a ring end portion fitting into the bore surrounding the shaft of the remote machine, and positioning the bearings for this shaft, so that the remote machine need not be specially constructed, or formed with a multiplicity of special locating surfaces, since the centricity of the bearing bore and of the shaft therein is determined by the machine bearing itself.

DRAWINGS

Figure 2:
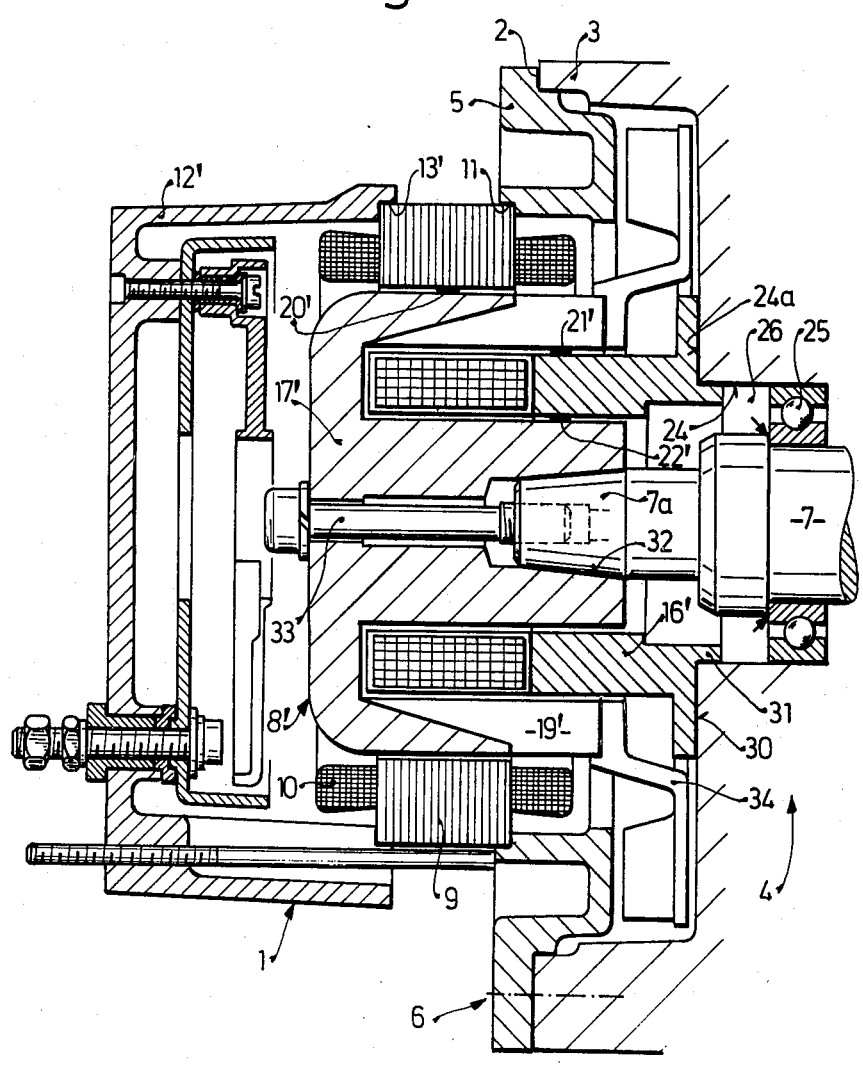

Illustrating a preferred example, wherein:

FIG. 1 is a longitudinal sectional view, showing the important elements of a claw pole generator which have a bearing on the present invention, in accordance with the prior art; and FIG. 2 shows a structure similar to FIG. 1, in which the present invention is incorporated and which can be used to replace the structure of FIG. 1.

The present invention will best be understood when one is familiar with the structure of the prior art, which will first be described with reference to FIG. 1: The bearingless claw pole generator 1 has a generator housing 5 which is fitted against the housing of the remote or foreign machine 4. It is secured thereto by suitable screws 6, shown only schematically. For accurate placement of the housing 5 with respect to the machine 4, the housing 5 is formed with a shoulder 2 which fits against a shoulder 3 formed in the housing of the machine 4, is exactly concentric to shaft 7 thereof, and accurately dimensioned with respect thereto. The generator housing 5 thus is first centered in position with respect to the shaft 7 by the engagement of the shoulders 2, 3. Locating the shoulder 3 with respect to the shaft 7 at an accurate dimension and exactly concentric thereto is comparatively simple in manufacture of the housing since the formation of the bore 26 for the bearing 25 of the shaft 7 of the machine and cutting of the shoulder 3 can usually be carried out in one production process, or in such a manner that accurate concentrically between the shaft 7 and the shoulder 3 is ensured. The foreign machine 4 can be a turbine, a motor, the housing of a gear of an internal combustion engine, or some other apparatus, with which the generator 1 is to be associated, and on which it is secured. The generator 1 does not have any bearings of its own. The positioning of the shoulder 3 on the machine on the shoulder 2 of the generator positions the fixed portion of the generator with respect to the shaft 7; the rotary portion 8 of the generator 1 is secured to the shaft 7 or to a stub shaft attached thereto. Thus, the rotor or rotary portion 8 of the generator is supported entirely from the shaft 7 and does not require any individual bearings. As can be seen, remote journalling of a generator having the rotor 8 secured to the shaft 7 requires precision in manufacture of the shoulder 3, since the relative position of the shoulder 3 and the axis of the shaft 7 will determine the relative position of the rotor and stator elements of the generator and hence the centricity of the air gaps therein.

The generator 1 has a stator stack 9 with stator windings 10 thereon. The stator stack 9 is fitted into the housing 5 at an edge or corner 11 formed in the housing. The end bell of the generator 1 is shown at 12. It is positioned with respect to the stator stack 9 by a corner notch 13. The end bell 12 and the housing portion 5 are connected together by bolts 14 and suitable nuts at the end thereof (not shown) as well known in generator construction. The further details of the structure of the generator housing 12 need not be described, since they can be standard and as well known in the field. The generator does, however, require an additional centering portion to secure the field in position. The centering portion is formed by a corner shoulder 15 which engages a ring-shaped flange 16 of the field structure. The field structure extends cup-shaped from the region of the hub, that is, the ring-shaped portion 16, to receive the inner portion of the claw pole rotor 17. The rotor core 17 is a cylindrical element with externally positioned claws 19, which surround the outer portions of the field 18. The shape of the outer claws 19 is so arranged that, upon rotation of rotor 8, the magnetic field between the stator field 18 and the armature 10 changes. Preferably, the stator armature coil 10 is wound as a three-phase armature. The particular construction of the rotor as well as of the field 18 is not material to the present invention, and any suitable well known construction may be used. It is to be noted that such generators have three air gaps, namely one air gap 20 between the armature and the outer portion of the claws 19 of the rotor; a second air gap 21 between the claws of the rotor and the stationary field structure 16, 18; and a third air gap 22 between the stationary field structure 16, 18 and the rotating core 17 of the rotor.

The rotor 8 is secured to the shaft 7 of the machine and journalled thereby. As is customary, the end of the shaft 7 or a stub attached thereto, is conically arranged and the core 17 of the rotor has a similar conical seat, so that the interengagement of the respective cones will result in a reliable and accurately centered seat of the rotor 8 with respect to shaft 7, and thus—theoretically—with respect to the remainder of the structure. If one considers, however, the number of interengaging fits which are necessary in order to accurately position the various elements and which all have an effect on the overall efficiency and quality of the air gaps, then it can easily be seen that the overall air gap quality between the armature structure 9 and the outer claws 19 of the rotor is determined by the fits at notches 2, 3 as well as by the fit of the corner 11 of the stator stack against the housing 5 and the precision of centricity of the rotor 8 on shaft 7. It has to be assumed that the flange 3 on the foreign machine 4, and that the bore 24 which journals the shaft 7 and its bearing, are accurately centered with respect to each other. These two elements on the remote machine can readily be made in a single manufacturing set-up, so that their centricity is ensured. Shaft 7 is journalled in a bearing 25, typically a ball bearing, roller bearing, or the like, and is sealed with respect to the generator by a sealing ring 26 to prevent escape of lubricant and the like.

The most critical air gaps in such a generator are the air gaps 21, 22. In addition to the accuracy of fit of shoulders 2 and 3 and 11, the additional fits of shoulders 13 and 15 on the generator itself, that is, on its housing portion 12, now come into play. The air gaps 21, 22 are comparatively remote from the locating corners 2, 3 and the bearing 25, so that any inaccuracies in precision alignment between the bell 12 of the housing and/or any other of the elements of the overall structural system will be magnified at the inner ends of the air gaps.

To provide for reliable and troublefree operation, it is thus necessary to construct such generators with the utmost accuracy so that they will have a sufficiently long life, and to assemble such generators together, and ultimately to the machine, with extreme accuracy. All the elements of the generator must be manufactured with high precision at all respective fits since the respective interengaging notches or corners which determine the location of relative elements of the alternator are also determinative of the quality of the air gap; there is no chance for later centering by a bearing, since this type of alternator has none.

The invention will be described with reference to FIG. 2, in which elements similar to those previously described have been given the same reference numerals, and generally similar elements the same reference numerals with prime notation; components which are identical will not be described again.

The inventive concept can be used with any generator which is remotely journalled, that is, with generators of other types of rotor construction, and different coupling connections to the shaft of the remote machine.

The basic concept of the invention is that all those portions of the generator which are determinative for the quality of the air gap are secured at one side of the generator, namely the side of the generator which is secured to the remote machine. Thus, centricity of all the elements can be readily ensured since, as has been noted, the end portion of the housing of the machine can easily be made accurately centered with respect to the shaft since only a single set-up for the formation of shoulders on the machine, and for the formation of the bearing bore, is required, thus ensuring concentricity of such positioning shoulders. In accordance with a preferred embodiment, and as will appear, only one such shoulder is needed, the edge of the bearing bore forming another. It is thus possible to so construct the arrangement that the fits of the bearing shoulder flanges or all other positioning features which are determinative of the relative centered position of components of the generator will be accurately concentric since they can all be made in a single machining set-up, without centering offset, or recentering. Consequently, the various components of the generator will also have an accurately concentric position and will no longer be dependent from each other with respect to their centering but rather only with respect to the center of the shaft of the remote machine. Thus, those components which are particularly determinative for the quality of the air gap—that is, for its circumferential uniformity and small size—will be centered solely by relative fits on the remote machine which, as has been noted, can easily be made with high precision.

The machine 4 has three fitting elements; one of them is the shaft 7; the other two stationary ones are the flange 3 to secure the housing 5 of the generator and to locate it in position; and the third is the outer edge of the bore 24 which faces the generator housing 5. This bore 24 is already provided in the machine structure anyway since it is necessary for positioning of the bearing 25. The bore 24 is formed with a forward abutment surface 24a. This is a preferred form; it is also possible to secure the field structure 16' not as shown in FIG. 2 by fitting into the corner of the bore 24, but by seating it on an individual shoulder on the housing of machine 4.

The stator or armature stack 9 is secured in the same manner as in FIG. 1 and correspondingly centered by the corner 11. The outer end bell 12' is also positioned by the corners 13' on the armature stack 9; this positioning need not be accurate, however, since the end bell 12' is no longer determinative for the position of the field structure 16'. The actual position of the end bell 12' becomes irrelevant for the operation of the generator and for the quality of the air gap. FIG. 2 clearly shows that the structure of the field 16' has been reversed with respect to its previous position and has been changed such that its fitting surface 30 fits against the surface 24a on the machine, and the centrally extending ring flange 31 fits inside the outer portion of the bore 24 in which the bearing 25 for the shaft 7 is secured. Thus, the bore 24 is used simultaneously as the bore for the bearing 25 and additionally as the locating or positioning shoulder for the field 16'. The field 16' may, also, serve as a holding element for the lubricant sealing ring 26. The field 16' can be secured to the machine 4 by suitable bolts, not shown, which can pass through the extending flange parallel to surface 30, and have slightly elongated holes through the field structure 16 so that the centered positioning is determined by the surfaces 24, 24a, 30, 31, and not by the bolts themselves. The field 16' carries the field winding 18' which is surrounded by the rotor 8' from the other side—with respect to FIG. 1.

The rotor has a rotor core 17' which is formed with an inner bore 32 of tapering or conical shape to receive a similarly tapered cone stub 7a at the end of the shaft 7, either integral therewith or as a separate stub element. The rotor 8' is secured to the stub shaft 7a by attaching means shown as a clamping bolt 33. The rotor core 17' is formed with laterally extended portions at the side remote from the field housing 16' from which claw poles 19' then extend. A fan blade 34 can be attached to the claw poles 19'. The structure of FIG. 1 also has a fan blade attached thereto, as well known. The three previously referred-to air gaps also occur in the structure of FIG. 2, namely the gaps 20', 21', 22'. The air gaps which are subject to varying magnetic loading, however, are located close to the fitting surfaces of the respective generator elements on the remote machine 4, as is clearly shown in FIG. 2. Thus, the air gaps will be of uniform quality, and can be smaller than in previous machines since their accuracy is more easily maintained.

In the preferred embodiment shown in FIG. 2, the field structure 16' is secured in the same bore 24 as the bearing 25, so that the shaft 7 and thus the rotor 17' are inherently correctly and precisely centered with respect to the innermost air gaps 21', 22'.

The arrangement has the additional advantage that the air gaps 21', 22' are closer to the bearing 25 on the remote machine than the air gaps 21, 22 of the structure of FIG. 1 of the prior art. Thus, any misalignment is less serious and accurate concentricity with uniform air gaps throughout the rotary position of the rotor with respect to the housing of the machine is ensured. Rubbing of the rotor with respect to the stator element is effectively avoided. Since the generator as such contains no contacting rotary and stationary elements, it is completely maintenance-free throughout its entire life.

The structure has the specific advantage with respect to that of FIG. 1 that the uniform distances of the air gaps, that is, the width of the air gaps between the rotary and stationary parts of the generator can be maintained with utmost precision since the fit of the stationary generator parts, namely the housing including the armature and the field structure on the one hand, and the bearings for the drive shaft for the rotary parts on the other are accurately determined by the relative position of the respective elements on the machine with which the generator is associated. Since this concentricity of the fitting edges and fitting corners or locating rings or flanges or bores on the machine can be concentrically maintained with a high degree of accuracy, the overall running fit, hence the quietness of operation, is enhanced. By using the structure as shown in FIG. 2, in which the field structure 16' is fitted directly into the bore for the bearing for the shaft, a precision locating abutment or ring or other precision positioning structure individual to the field structure can be eliminated, thus reducing manufacturing costs.

The inner hub portion of the field structure also is substantially simplified and can be easily made to fit directly into the bore already available on the machine element for the bearing 25. Since this bore must be precisely placed to ensure accurate operation of the shaft 7 for the remote machine itself, no additional accurate manufacturing is needed for use of the generator, other than the formation of the locating shoulder 3.

Various changes and modifications may be made within the scope of the inventive concept.

I claim:

1. The combination of a remote machine (4) comprising a housing;
   a rotary machine shaft (7);
   a rotary seating surface coaxial with said shaft formed on a surface portion thereof;
   and a stationary seating surface (3) formed on the housing, concentrically positioned with respect to the axis of the machine shaft (7),
   with
   a bearingless, remotely journaled generator comprising stationary parts including
   a frame (5);
   a stationary engagement surface (2) formed on the frame adapted to fit against the stationary seating surface on the housing in positioned alignment;
   an armature structure (9, 10) and a field structure (16');
   and rotary parts including
   a rotor (8, 17', 19');
   a rotary engagement surface formed on a rotary surface portion of the rotor adapted to interfit with the rotary seating surface on the machine shaft (7) and attaching means (33) securing said surfaces in positioned alignment,
   and wherein the interfitting engagement surfaces (2) of the stationary parts (5, 9, 16', 31) of the generator and the interfitting engagement surfaces (32) of the rotary parts (8') of the generator are all located at the side of the generator adjacent the housing and the shaft, respectively, of the remote machine (4),
   the rotary parts of the generator being secured to and solely supported by the machine shaft (7).

2. The combination of claim 1, comprising
   a bearing (25) journaling the machine shaft (7);
   a bore (24) open towards the side of the generator formed in the end portion of the housing of the machine facing the generator, said bearing (25) being positioned in said bore (24);

and wherein the surfaces of the machine structure adjacent said bore form additional stationary seating surfaces, the field structure (16') of the generator being formed with an abutment ring (31) defining an additional stationary engagement surface, said additional engagement surface and additional seating surface being fitted together.

3. The combination of claim 2, further including a flange surface (30) formed on said field structure of the generator and fitting against an adjacent facing surface portion of the end portion of the remote machine (4) surrounding said bore (24).

4. The combination of claim 1 or 2 or 3, wherein the rotary part of the generator includes a pole core (17') formed with a tapering opening therein facing the shaft (7) of the remote machine, the shaft (7) of the remote machine being formed with a matching tapering projection (7a) to form said interengaging surface (32) of the rotary part (8') of the generator and the shaft;

and the pole structure comprises claw pole fingers (19') extending from a portion of the core remote from the tapering shaft projection (7'), the remote machine and overlapping the field structure (16', 18).

5. The combination of claim 4, wherein the armature is a three-phase armature and the generator is a three-phase claw pole generator.

* * * * *